US012565406B2

(12) United States Patent
Han

(10) Patent No.: US 12,565,406 B2
(45) Date of Patent: Mar. 3, 2026

(54) HAND WINCH

(71) Applicant: Hangzhou Rock Machinery Manufacture Co., Ltd, Hangzhou (CN)

(72) Inventor: Minjie Han, Hangzhou (CN)

(73) Assignee: Hangzhou Rock Machinery Manufacture Co., Ltd, Hangzhou (CN)

( * ) Notice: Subject to any disclaimer, the term of this patent is extended or adjusted under 35 U.S.C. 154(b) by 212 days.

(21) Appl. No.: 18/644,941

(22) Filed: Apr. 24, 2024

(65) Prior Publication Data

US 2025/0296819 A1 Sep. 25, 2025

(30) Foreign Application Priority Data

Mar. 21, 2024 (CN) ......................... 202410326645.8
Mar. 21, 2024 (CN) ......................... 202420556183.4

(51) Int. Cl.
*B66D 1/04* (2006.01)
*B66D 1/14* (2006.01)
*B66D 1/54* (2006.01)

(52) U.S. Cl.
CPC ................. *B66D 1/04* (2013.01); *B66D 1/14* (2013.01); *B66D 1/54* (2013.01)

(58) Field of Classification Search
CPC ... B66D 1/04; B66D 1/06; B66D 1/14; B66D 1/16; B66D 1/20; B66D 1/28; B66D 1/30; B66D 1/34; B66D 1/36; B66D 1/7452; B66D 1/7468; B66D 2700/0116; B66D 2700/0183; B66D 3/02; B66D 3/14; B66D 5/02; B66D 5/16
See application file for complete search history.

(56) References Cited

U.S. PATENT DOCUMENTS 2,297,912 A * 10/1942 Payson .................... B66D 1/14 254/347
2,590,610 A * 3/1952 Grosch .................... B66D 1/06 188/82.9

(Continued)

FOREIGN PATENT DOCUMENTS

CN 203865916 U * 10/2014
CN 105909692 A * 8/2016 ............. F16D 41/06

(Continued)

*Primary Examiner* — Anna M Momper
*Assistant Examiner* — Henrix Soto
(74) *Attorney, Agent, or Firm* — Schwegman Lundberg & Woessner, P.A.

(57) ABSTRACT

A hand winch is provided in the disclosure, which includes a first bracket, a second bracket, a first rotating shaft, a second rotating shaft, a handle, a one-way bearing assembly, a protective shell, a disc spring and an adjusting nut. The first rotating shaft and the second rotating shaft are respectively rotatably arranged on the first bracket and the second bracket, and the first rotating shaft is matched with the second rotating shaft, and the second rotating shaft has a reel. The handle is directly or indirectly matched with the first rotating shaft, the protective shell is arranged on the first bracket, the one-way bearing assembly is sleeved on the first rotating shaft, the one-way bearing assembly and the disc spring are located in the protective shell. The winch has benefits that the cable is prevented from being released too fast by the reel and potential safety hazard is reduced.

8 Claims, 5 Drawing Sheets

(56) References Cited

U.S. PATENT DOCUMENTS

| | | | | | |
|---|---|---|---|---|---|
| 2,961,217 | A * | 11/1960 | Sacchini | B66D 5/00 | 188/82.6 |
| 3,051,447 | A * | 8/1962 | Ahlbin | B66D 3/02 | 254/362 |
| 3,220,701 | A * | 11/1965 | Clausen | B66D 1/20 | 254/362 |
| 4,046,235 | A * | 9/1977 | Shutt | B66D 5/22 | 192/223.1 |
| 4,251,060 | A * | 2/1981 | Suzuki | B66D 3/14 | 192/16 |
| 4,358,088 | A * | 11/1982 | House | B66D 1/14 | 254/323 |
| 4,589,523 | A * | 5/1986 | Olson | A62B 35/0093 | 182/234 |
| 5,535,988 | A * | 7/1996 | Nishimura | B66D 3/14 | 254/352 |
| 2023/0249951 | A1* | 8/2023 | Hsieh | B66D 1/06 | 254/357 |

FOREIGN PATENT DOCUMENTS

| | | | | |
|---|---|---|---|---|
| CN | 107098283 | A * | 8/2017 | B66D 1/30 |
| CN | 210286564 | U * | 4/2020 | |
| CN | 112919352 | A * | 6/2021 | B66D 1/7468 |
| CN | 114014196 | A * | 2/2022 | B66D 1/14 |
| CN | 114044456 | A * | 2/2022 | B66D 1/04 |
| CN | 217780620 | U | 11/2022 | |
| CN | 115626578 | A * | 1/2023 | B66D 1/04 |
| DE | 3630458 | A1 * | 3/1988 | B66D 1/04 |
| DE | 102012004144 | A1 * | 8/2013 | F21S 43/245 |
| GB | 2200714 | A * | 8/1988 | F16H 1/08 |
| JP | H0221040 | A * | 1/1990 | |
| KR | 100861080 | B1 * | 9/2008 | B66D 1/04 |
| KR | 102139091 | B1 * | 7/2020 | B63B 23/48 |

* cited by examiner

HAND WINCH

CROSS REFERENCE TO THE RELATED APPLICATIONS

This Non-provisional application claims priority under 35 U.S.C. § 119(a) to Chinese Patent Application No. CN202410326645.8 filed on Mar. 21, 2024, and to Chinese Patent Application No. CN202420556183.4 filed on Mar. 21, 2024, the entire contents of each of which are hereby incorporated by reference.

TECHNICAL FIELD

The disclosure relates to the field of winch equipment, in particular to a hand winch.

BACKGROUND ART

A hand winch is currently widely used due to its reliability in use. A hand winch is disclosed in the patent publication No. CN217780620U, and there is a problem in use of the winch with this structure that a cable is winded up when a handle of the hand winch with this structure is rotated forward, and is released when the handle is rotated reversely, in which resistance of a bracket base (referenced 1 in the publication) to a reel (referenced 9 in the publication) is the same during forward rotation and reverse rotation of the handle (the forward rotation and reverse rotation of the handle serve to drive the reel to rotate forward and reversely), and in order to save arm power of a user as much as possible during the forward rotation, the whole winch is designed with reduced resistance of the bracket base to the reel as much as possible when the reel rotates. Therefore, when the hand winch with this structure is rotated reversely, a heavy object suspended on the cable of the winch may fall off rapidly once the user's arm power is not enough to control a reverse rotation speed, which poses great potential safety hazard. Moreover, when a driven gear is locked by a locking mechanism (referenced 10 in the publication), the driven gear and the locking mechanism itself have greater probability of breaking.

SUMMARY

In view of the above problems, a hand winch is provided in the present disclosure.

Technical schemes adopted in the disclosure are as follows.

A hand winch includes a first bracket, a second bracket, a first rotating shaft and a second rotating shaft. The first bracket is matched with the second bracket, the first rotating shaft is rotatably arranged on the first bracket, the second rotating shaft is rotatably arranged on the second bracket, and the first rotating shaft is matched with the second rotating shaft, and the second rotating shaft is provided with a reel, the hand winch further includes a handle, a one-way bearing assembly, a protective shell, a disc spring and an adjusting nut. The handle is directly or indirectly matched with the first rotating shaft, the protective shell is arranged on the first bracket, the one-way bearing assembly is sleeved on the first rotating shaft, the one-way bearing assembly is located in the protective shell, the disc spring is arranged in the protective shell, the adjusting nut is arranged on the protective shell, and both ends of the disc spring directly or indirectly abut against the adjusting nut and the one-way bearing assembly respectively. When the first rotating shaft rotates forward, the one-way bearing assembly does not rotate with the first rotating shaft, and when the first rotating shaft rotates reversely, the one-way bearing assembly rotates with the first rotating shaft.

In the hand winch according to the disclosure, the handle is configured to drive the first rotating shaft to rotate, and rotation of the first rotating shaft drives the second rotating shaft to rotate together, and the reel rotates together with the second rotating shaft, and the reel is configured for winding up or releasing a cable.

In the hand winch according to the disclosure, when the handle drives the first rotating shaft to rotate forward, the second rotating shaft rotates forward along with the first rotating shaft. At this time, the reel is configured for winding a cable. When the first rotating shaft rotates forward, the one-way bearing assembly does not rotate with the first rotating shaft, and thus the adjusting nut, the disc spring and the one-way bearing assembly do not exert rotation resistance on the first rotating shaft during forward rotation. When the first rotating shaft rotates reversely, the second rotating shaft also rotates reversely, and the reel on the second rotating shaft also rotates reversely at the same time, and the reel begins to release the cable. When the first rotating shaft rotates reversely, the one-way bearing assembly rotates with the first rotating shaft, and at this time, the adjusting nut and the disc spring cause rotation resistance to the one-way bearing assembly, which can prevent a reverse rotation speed of the first rotating shaft from being too fast, thus preventing the cable from being released by the reel too fast and reducing potential safety hazard.

To sum up, in the hand winch according to the disclosure, the one-way bearing assembly is arranged on the first rotating shaft, so that the one-way bearing assembly is not subjected to external friction resistance when the first rotating shaft rotates forward to wind up the cable; and the one-way bearing assembly is subjected to external friction resistance when the first rotating shaft rotates reversely to release the cable, so as to prevent the cable from being released by the reel too fast and reducing the potential safety hazard.

Meanwhile, in the hand winch according to the disclosure, because an installation position of the adjusting nut can be adjusted, deformation of the disc spring can be changed by screwing the adjusting nut, so as to adjust rotation resistance formed to the one-way bearing assembly, and thus for the hand winch according to the disclosure, resistance subjected by the first rotating shaft in reverse rotation can be adjusted as required.

In the hand winch according to the disclosure, the second bracket is generally a flat-bottomed U-shaped bracket while the first bracket is generally box-shaped, and the first bracket and the second bracket are fixed together by a fastener such as a screw.

In the hand winch according to the disclosure, the first rotating shaft and the second rotating shaft can be matched together in a manner similar to that of a worm gear. Specifically, the first rotating shaft can be provided with a worm, the second rotating shaft can be provided with a worm wheel, and the worm wheel and the worm are matched together. Similarly, the first rotating shaft can be provided with a helical gear, and the second rotating shaft can be also provided with a helical gear, and the helical gear on the first rotating shaft is meshed with the helical gear on the second rotating shaft.

In the hand winch according to the disclosure, the first rotating shaft and the second rotating shaft are perpendicular to each other, and the first rotating shaft and the second rotating shaft are roughly distributed in a cross shape, and a matching point of the first rotating shaft and the second rotating shaft is located in the first bracket.

Specifically, in the hand winch according to the disclosure, a plurality of disc springs are stacked and sleeved on the first rotating shaft, the disc springs are located in the protective shell, the disc springs are mainly supported by an inner shell wall of the protective shell, and the disc springs are not in contact with the first rotating shaft.

Optionally, the hand winch further includes a friction gasket. The friction gasket is arranged between the one-way bearing assembly and the disc spring, and the friction gasket is located in the protective shell.

The friction gasket is provided to increase applied resistance when the first rotating shaft rotates reversely on one hand, and to prevent the disc springs from being contacted with the one-way bearing assembly on the other hand, thus reducing wear of the disc springs.

Optionally, the friction gasket is provided with a convex part, and a groove is defined in an inner wall of the protective shell, and the convex part is matched with the groove.

The friction gasket is provided with the convex part, and the groove is defined in the inner wall of the protective shell, the groove is matched with the convex part, so that the friction gasket can be in a fixed state relative to the protective shell, and thus friction resistance between the friction gasket and the one-way bearing assembly is constant on a premise of ignoring the wear of the disc springs.

Optionally, the hand winch further includes a connecting rod which is rotatably arranged on the first bracket, the first rotating shaft and the connecting rod are both provided with a helical gear, the helical gear on the first rotating shaft are matched with the helical gear on the connecting rod, and the handle is detachably matched with the connecting rod.

Specifically, the connecting rod is parallel to the second rotating shaft. In order to protect the helical gear, the first bracket is provided with a protective cover, the helical gear is located in the protective cover, and an end of the connecting rod is also located in the protective cover.

Specifically, the protective cover and the protective shell are located at two ends of the first bracket respectively, and both the protective cover and the protective shell are fixed to the first bracket through a fastener such as a bolt or a screw.

Optionally, the handle is provided with a matching sleeve which is sleeved and matched with the connecting rod, a limit bolt is provided on the matching sleeve and a limit ring groove is provided on the connecting rod, and the limit ring groove is configured to be matched with the limit bolt.

Specifically, in order to facilitate use of the handle, at least two sleeves are provided on the handle, and the at least two sleeves on the handle are located at different positions on the handle. All of the sleeves on the handle have a same structure, and each of the sleeves is mounted with the limit bolt.

In order to ensure sleeving stability between the matching sleeve and the connecting rod, an end of the connecting rod is in a shape of a square column, and a hole in the matching sleeve is a square hole. In sleeving and matching, the end of the connecting rod in the shape of the square column is directly sleeved in the square hole of the matching sleeve, and at the same time, the limit bolt is screwed so that an end of the limit bolt enters the limit ring groove, thus preventing the connecting rod from slipping off the matching sleeve and improving stability of the handle in driving the connecting rod to rotate.

Optionally, the hand winch further includes a baffle and a torsion spring, a pin shaft is rotatably provided on the second bracket, an end of the baffle is rotatably matched with the pin shaft, the torsion spring is sleeved on the pin shaft, one end of the torsion spring abuts against the baffle, and the other end of the torsion spring abuts against the second bracket, and the torsion spring is configured for driving the baffle to rotate and to cling to the reel.

Specifically, the baffle is rotatably installed on the second bracket through the torsion spring and the pin shaft, and the torsion spring has a tendency to drive the baffle to rotate toward the reel, and the torsion spring drives the baffle to rotate to cling to the reel, so that the cable can always be wound neatly on the reel in a process of winding up or releasing the cable by the reel.

Optionally, the hand winch further includes a side flapper. The side flapper is arranged on the reel, and the side flapper is provided at both ends of the reel, and the baffle is positioned between the two side flappers.

The side flapper serves to prevent the cable from falling off the reel.

The disclosure has beneficial effects that the one-way bearing assembly is arranged on the first rotating shaft, so that the one-way bearing assembly is not subjected to external friction resistance when the first rotating shaft rotates forward to wind up the cable; and the one-way bearing assembly is subjected to external friction resistance when the first rotating shaft rotates reversely to release the cable, so as to prevent the cable from being released by the reel too fast and reducing the potential safety hazard.

Figure 1:
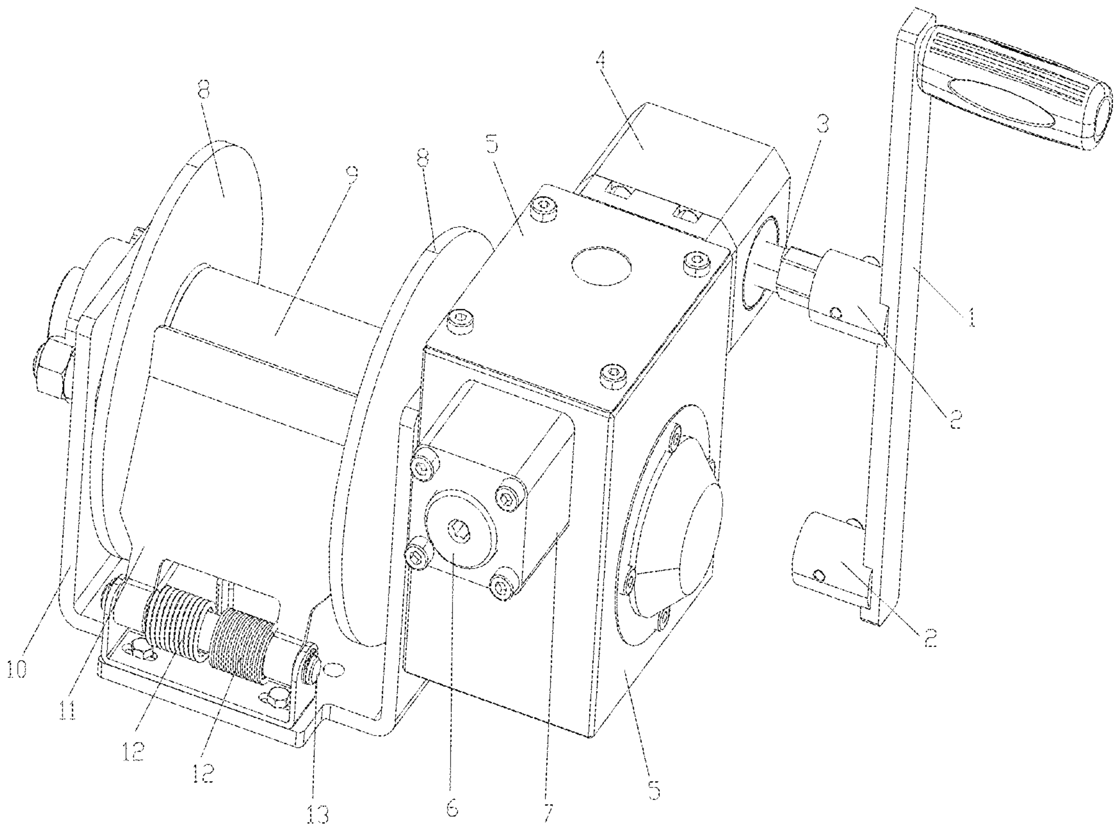
FIG. 1 is a schematic view of a structure of a hand winch according to the disclosure.

Reference numbers are as follows: 1. Handle; 2. Matching Sleeve; 201. Square Hole; 3. Connecting Rod; 301. Limit Ring Groove; 4. Protective Cover; 5. First Bracket; 6. Adjust Nut; 601. Hexagonal Hole; 602. Settling Tank; 7. Protective Shell; 701. Groove; 8. Side Flapper; 9. Reel; 901. Cable Fixing Hole; 10. Second Bracket; 11. Baffle; 12. Torsion Spring; 13, Pin Shaft; 14. Helical Gear; 15. Support Bearing; 16. First Rotating Shaft; 17. Second Rotating Shaft; 18. One-way Bearing Assembly; 19. Friction Gasket; 1901. Convex Part; 20. Disc Spring; 21. Limit Bolt.

DETAILED DESCRIPTION

The present disclosure will be described in detail with reference to the accompanying drawings.

As shown in FIGS. 1 to 7, a hand winch includes a first bracket 5, a second bracket 10, a first rotating shaft 16 and a second rotating shaft 17. The first bracket 5 is matched with the second bracket 10, the first rotating shaft 16 is rotatably arranged on the first bracket 5, the second rotating shaft 17 is rotatably arranged on the second bracket 10, and the first rotating shaft 16 is matched with the second rotating shaft 17, and the second rotating shaft 17 is provided with a reel 9, the hand winch further includes a handle 1, a one-way bearing assembly 18, a protective shell 7, a disc spring 20 and an adjusting nut 6. The handle 1 is directly or indirectly matched with the first rotating shaft 16, the protective shell 7 is arranged on the first bracket 5, the one-way bearing assembly 18 is sleeved on the first rotating shaft 16, the one-way bearing assembly 18 is located in the protective shell 7, the disc spring 20 is arranged in the protective shell 7, the adjusting nut 6 is arranged on the protective shell 7, and both ends of the disc spring 20 directly or indirectly abut against the adjusting nut 6 and the one-way bearing assembly 18 respectively. When the first rotating shaft 16 rotates forward, the one-way bearing assembly 18 does not rotate with the first rotating shaft 16, and when the first rotating shaft 16 rotates reversely, the one-way bearing assembly 18 rotates with the first rotating shaft 16.

In the hand winch according to the disclosure, the handle 1 is configured to drive the first rotating shaft 16 to rotate, and rotation of the first rotating shaft 16 drives the second rotating shaft 17 to rotate together, and the reel 9 rotates together with the second rotating shaft 17, and the reel 9 is configured for winding up or releasing a cable.

In the hand winch according to the disclosure, when the handle 1 drives the first rotating shaft 16 to rotate forward, the second rotating shaft 17 rotates forward along with the first rotating shaft 16. At this time, the reel 9 is configured for winding a cable. When the first rotating shaft 16 rotates forward, the one-way bearing assembly 18 does not rotate with the first rotating shaft 16, and thus the adjusting nut 6, the disc spring 20 and the one-way bearing assembly 18 do not exert rotation resistance on the first rotating shaft 16 during forward rotation. When the first rotating shaft 16 rotates reversely, the second rotating shaft 17 also rotates reversely, and the reel 9 on the second rotating shaft 17 also rotates reversely at the same time, and the reel 9 begins to release the cable. When the first rotating shaft 16 rotates reversely, the one-way bearing assembly 18 rotates with the first rotating shaft 16, and at this time, the adjusting nut 6 and the disc spring 20 cause rotation resistance to the one-way bearing assembly 18, which can prevent a reverse rotation speed of the first rotating shaft 16 from being too fast, thus preventing the cable from being released by the reel 9 too fast and reducing potential safety hazard.

To sum up, in the hand winch according to the disclosure, the one-way bearing assembly 18 is arranged on the first rotating shaft 16, so that the one-way bearing assembly 18 is not subjected to external friction resistance when the first rotating shaft 16 rotates forward to wind up the cable; and the one-way bearing assembly 18 is subjected to external friction resistance when the first rotating shaft 16 rotates reversely to release the cable, so as to prevent the cable from being released by the reel 9 too fast and reducing the potential safety hazard.

Meanwhile, in the hand winch according to the disclosure, because an installation position of the adjusting nut 6 can be adjusted, deformation of the disc spring 20 can be changed by screwing the adjusting nut 6, so as to adjust rotation resistance formed to the one-way bearing assembly 18, and thus for the hand winch according to the disclosure, resistance subjected by the first rotating shaft 16 in reverse rotation can be adjusted as required.

In the hand winch according to the disclosure, the second bracket 10 is generally a flat-bottomed U-shaped bracket while the first bracket 5 is generally box-shaped, and the first bracket 5 and the second bracket 10 are fixed together by a fastener such as a screw.

In the hand winch according to the disclosure, the first rotating shaft 16 and the second rotating shaft 17 can be matched together in a manner similar to that of a worm gear. Specifically, the first rotating shaft 16 can be provided with a worm, the second rotating shaft 17 can be provided with a worm wheel, and the worm wheel and the worm are matched together (which is a feasible scheme, not shown). Similarly, the first rotating shaft 16 can be provided with a helical gear, and the second rotating shaft 17 can be also provided with a helical gear, and the helical gear on the first rotating shaft 16 is meshed with the helical gear on the second rotating shaft 17 (which is a feasible scheme, not shown).

In the hand winch according to the disclosure, the first rotating shaft 16 and the second rotating shaft 17 are perpendicular to each other, and the first rotating shaft 16 and the second rotating shaft 17 are roughly distributed in a cross shape, and a matching point of the first rotating shaft 16 and the second rotating shaft 17 is located in the first bracket 5. The second rotating shaft is parallel to the connecting rod, and the connecting rod is perpendicular to the first rotating shaft.

Specifically, in the hand winch according to the disclosure, a plurality of disc springs 20 are stacked and sleeved on the first rotating shaft 16, the disc springs 20 are located in the protective shell 7, the disc springs 20 are mainly supported by an inner shell wall of the protective shell 7, and the disc springs 20 are not in contact with the first rotating shaft 16.

Figure 4:
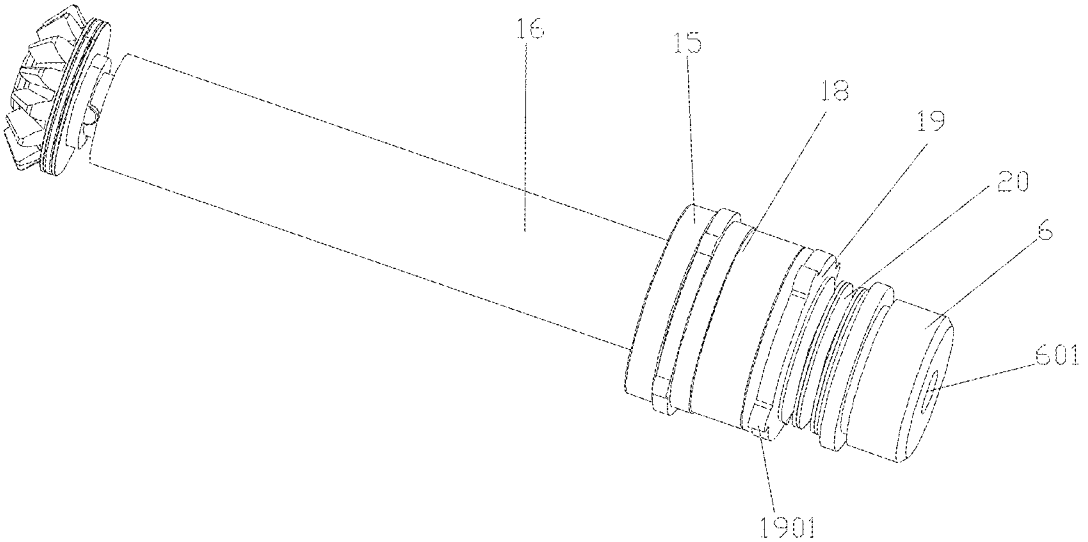
FIG. 4 is a schematic view of a positional relationship among a one-way bearing, a friction gasket and a disc spring according to the disclosure.
Figure 5:
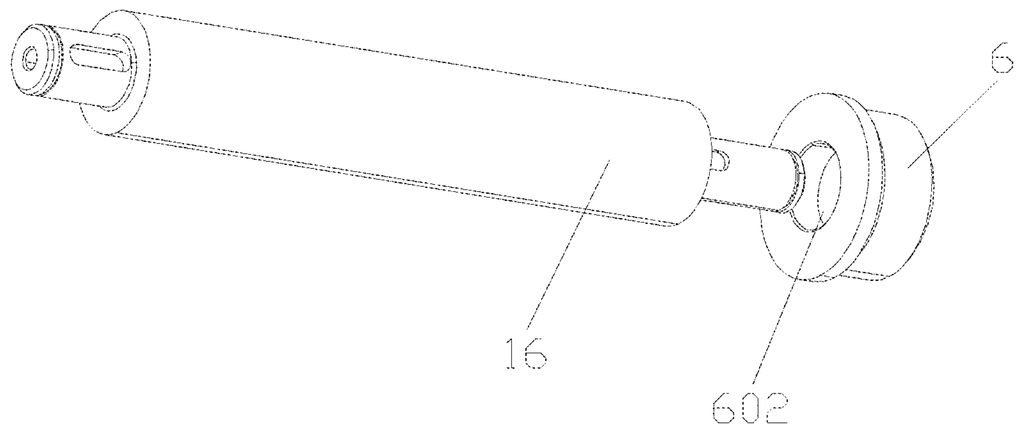
FIG. 5 is a schematic view of a positional relationship between an adjusting nut and a first rotating shaft according to the disclosure.

As shown in FIGS. 1, 4 and 5, the hand winch further includes a friction gasket 19. The friction gasket 19 is arranged between the one-way bearing assembly 18 and the disc spring 20, and the friction gasket 19 is located in the protective shell 7. The friction gasket is roughly annular in shape.

The friction gasket 19 is provided to increase applied resistance when the first rotating shaft 16 rotates reversely on one hand, and to prevent the disc springs 20 from being contacted with the one-way bearing assembly 18 on the other hand, thus reducing wear of the disc springs 20.

An adjustment process is described in detail in combination with FIG. 4 and FIG. 5. Firstly, the adjusting nut 6 is defined with a hexagonal hole 601, and a hexagon wrench can screw the adjusting nut 6 to rotate on the protective shell 7 through the hexagon hole 601. When the adjusting nut 6 moves to left, the one-way bearing assembly 18 is subjected to increased resistance in rotation, and when the adjusting nut 6 moves to right, the one-way bearing assembly 18 is subjected to decreased resistance.

Referring to FIG. 5, a settling tank 602 is defined at a side of the adjusting nut 6, and when the adjusting nut 6 moves to the left, a part of the first rotating shaft 16 can enter and be accommodated in the settling tank 602.

Figure 7:
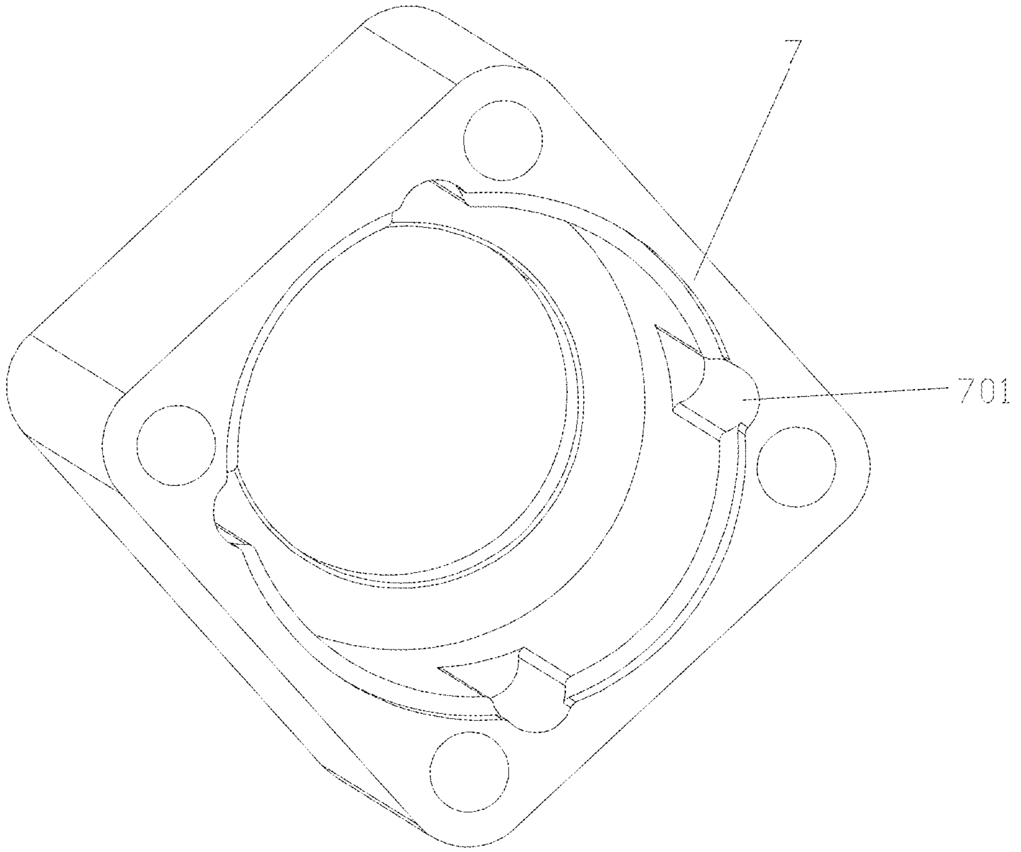
FIG. 7 is a schematic view of a structure of a protective shell according to the disclosure.

As shown in FIG. 4 and FIG. 7, the friction gasket 19 is provided with a convex part 1901, and a groove 701 is defined in an inner wall of the protective shell 7, and the convex part 1901 is matched with the groove 701.

The friction gasket 19 is provided with the convex part 1901, and the groove 701 is defined in the inner wall of the protective shell 7, the groove 701 is matched with the convex part 1901, so that the friction gasket 19 can be in a fixed state relative to the protective shell 7, and thus friction resistance between the friction gasket 19 and the one-way bearing assembly 18 is constant on a premise of ignoring the wear of the disc springs 20.

Figure 3:
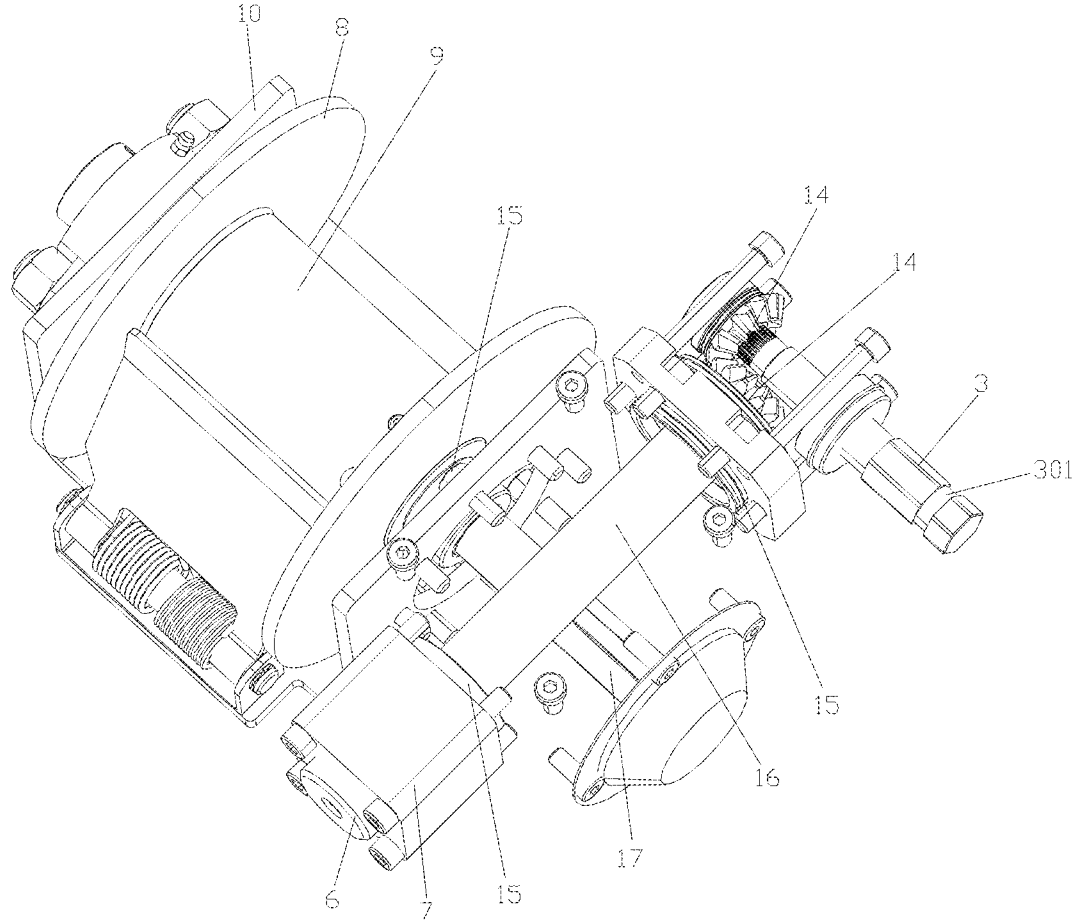
FIG. 3 is a schematic view of a positional relationship between a first rotating shaft and a second rotating shaft according to the disclosure.
Figure 6:
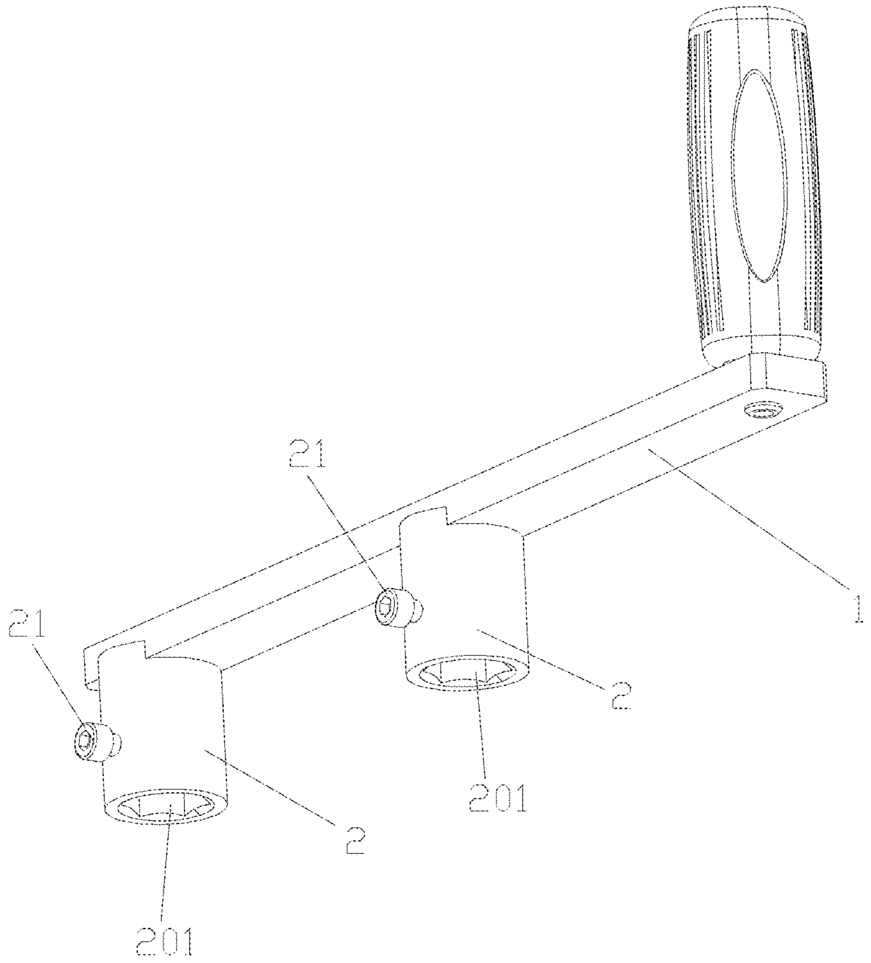
FIG. 6 is a schematic view of a structure of a handle according to the disclosure.

As shown in FIG. 3 and FIG. 6, the hand winch further includes a connecting rod 3 which is rotatably arranged on the first bracket 5, the first rotating shaft 16 and the connecting rod 3 are both provided with a helical gear 14, the helical gear 14 on the first rotating shaft 16 are matched with the helical gear 14 on the connecting rod 3, and the handle 1 is detachably matched with the connecting rod 3.

Specifically, the connecting rod 3 is parallel to the second rotating shaft 17. In order to protect the helical gear 14, the first bracket 5 is provided with a protective cover 4, the helical gear 14 is located in the protective cover 4, and an end of the connecting rod 3 is also located in the protective cover 4.

Specifically, the protective cover 4 and the protective shell 7 are located at two ends of the first bracket 5 respectively, and both the protective cover 4 and the protective shell 7 are fixed to the first bracket 5 through a fastener such as a bolt or a screw.

As shown in FIGS. 1, 3 and 6, the handle 1 is provided with a matching sleeve 2 which is sleeved and matched with the connecting rod 3, a limit bolt 21 is provided on the matching sleeve 2 and a limit ring groove 301 is provided on the connecting rod 3, and the limit ring groove 301 is configured to be matched with the limit bolt 21.

Specifically, in order to facilitate use of the handle 1, at least two sleeves are provided on the handle 1, and the at least two sleeves on the handle 1 are located at different positions on the handle 1. All of the sleeves on the handle 1 have a same structure, and each of the sleeves is mounted with the limit bolt 21.

In order to ensure sleeving stability between the matching sleeve 2 and the connecting rod 3, an end of the connecting rod 3 is in a shape of a square column, and a hole in the matching sleeve 2 is a square hole 201. In sleeving and matching, the end of the connecting rod 3 in the shape of the square column is directly sleeved in the square hole 201 of the matching sleeve 2, and at the same time, the limit bolt 21 is screwed so that an end of the limit bolt 21 enters the limit ring groove 301, thus preventing the connecting rod 3 from slipping off the matching sleeve 2 and improving stability of the handle 1 in driving the connecting rod 3 to rotate.

It is particularly noted that when the handle 1 is detached and a shaft of a motor is connected with the connecting rod 3, the whole winch is an electric winch.

Figure 2:
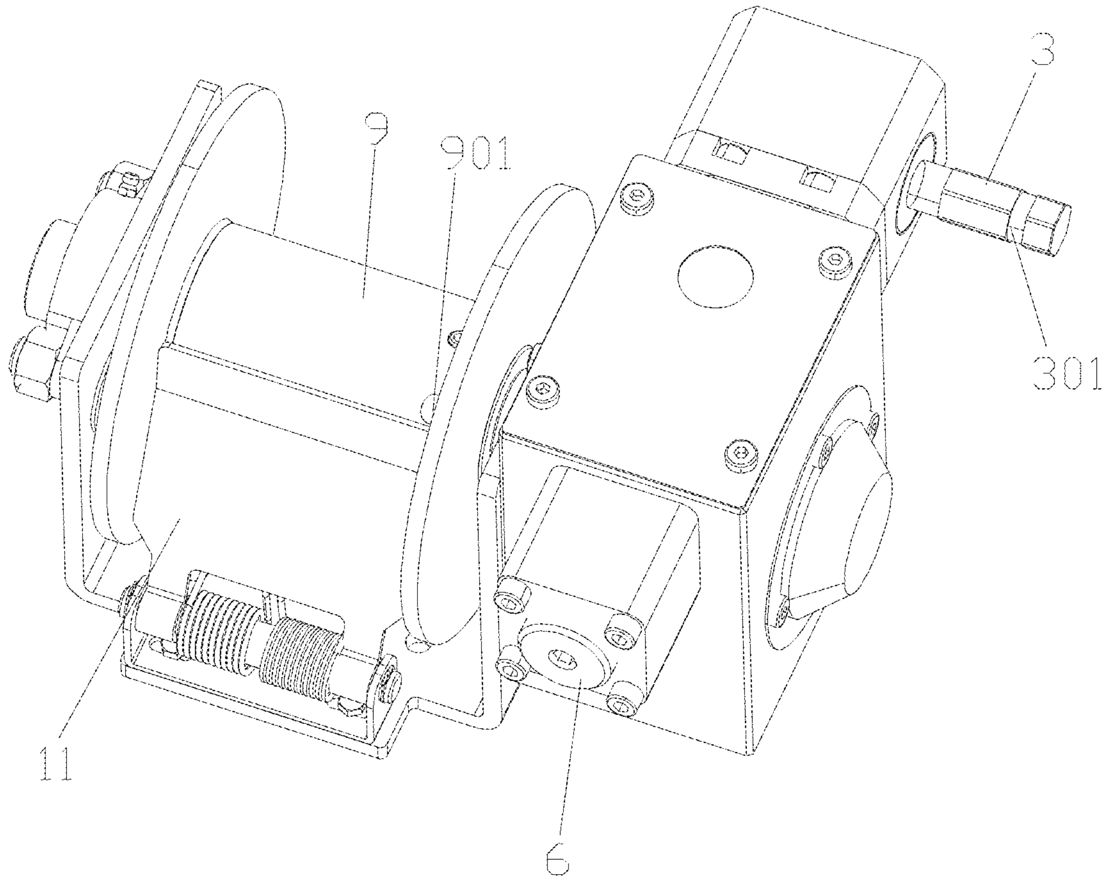
FIG. 2 is a schematic view of a matching relationship between a first bracket and a second bracket according to the disclosure.

As shown in FIGS. 1 and 2, the hand winch further includes a baffle 11 and a torsion spring 12, a pin shaft 13 is rotatably provided on the second bracket 10, an end of the baffle 11 is rotatably matched with the pin shaft 13, the torsion spring 12 is sleeved on the pin shaft 13, one end of the torsion spring 12 abuts against the baffle 11, and the other end of the torsion spring 12 abuts against the second bracket 10, and the torsion spring 12 is configured for driving the baffle 11 to rotate and to cling to the reel 9.

Specifically, the baffle 11 is rotatably installed on the second bracket 10 through the torsion spring 12 and the pin shaft 13, and the torsion spring 12 has a tendency to drive the baffle 11 to rotate toward the reel 9, and the torsion spring 12 drives the baffle 11 to rotate to cling to the reel 9, so that the cable can always be wound neatly on the reel 9 in a process of winding up or releasing the cable by the reel 9.

As shown in FIGS. 1 and 2, the hand winch further includes a side flapper 8. The side flapper 8 is arranged on the reel 9, and the side flapper 8 is provided at both ends of the reel 9, and the baffle 11 is positioned between the two side flappers 8.

The side flapper 8 serves to prevent the cable from falling off the reel 9. The side flapper 8 is a disk-shaped side flapper.

Specifically, the reel 9 is fixed to the second rotating shaft 17 by a screw or a bolt. In order to fix an end of the cable conveniently, the reel is defined with a cable fixing hole 901, and the end of the cable can be fixed to the cable fixing hole 901.

Specifically, in this winch, in order to ensure smoothness of the first rotating shaft, the second rotating shaft and the connecting rod in rotation, a support bearing 15 is provided between the first rotating shaft and the first bracket, between the second rotating shaft and the second bracket, and between the connecting rod and the protective cover, respectively.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A hand winch comprising a first bracket, a second bracket, a first rotating shaft and a second rotating shaft, the first bracket being matched with the second bracket, the first rotating shaft being rotatably arranged on the first bracket, the second rotating shaft being rotatably arranged on the second bracket, and the first rotating shaft being matched with the second rotating shaft, and the second rotating shaft being provided with a reel, the hand winch further comprising a handle, a one-way bearing assembly, a protective shell, a disc spring and an adjusting nut, wherein the handle is directly or indirectly matched with the first rotating shaft, the protective shell is arranged on the first bracket, the one-way bearing assembly is sleeved on the first rotating shaft, the one-way bearing assembly is located in the protective shell, the disc spring is arranged in the protective shell, the adjusting nut is arranged on the protective shell, and both ends of the disc spring directly or indirectly abut against the adjusting nut and the one-way bearing assembly respectively; and when the first rotating shaft rotates forward, the one-way bearing assembly does not rotate with the first rotating shaft, and when the first rotating shaft rotates reversely, the one-way bearing assembly rotates with the first rotating shaft.

2. The hand winch according to claim 1, further comprising a friction gasket, wherein the friction gasket is arranged between the one-way bearing assembly and the disc spring, and the friction gasket is located in the protective shell.

3. The hand winch according to claim 2, wherein the friction gasket is provided with a convex part, and a groove is defined in an inner wall of the protective shell, and the convex part is matched with the groove.

4. The hand winch according to claim 1, further comprising a connecting rod which is rotatably arranged on the first bracket, wherein the first rotating shaft and the connecting rod are both provided with a helical gear, the helical gear on the first rotating shaft is matched with the helical gear on the connecting rod, and the handle is detachably matched with the connecting rod.

5. The hand winch according to claim 4, wherein the handle is provided with a matching sleeve which is sleeved and matched with the connecting rod, a limit bolt is provided on the matching sleeve and a limit ring groove is provided on the connecting rod, and the limit ring groove is configured to be matched with the limit bolt.

6. The hand winch according to claim 1, further comprising a baffle and a torsion spring, wherein a pin shaft is rotatably provided on the second bracket, an end of the baffle is rotatably matched with the pin shaft, the torsion spring is sleeved on the pin shaft, one end of the torsion spring abuts against the baffle, and the other end of the torsion spring abuts against the second bracket, and the torsion spring is configured for driving the baffle to rotate and to cling to the reel.

7. The hand winch according to claim 6, further comprising a side flapper, wherein the side flapper is arranged on the reel, and the side flapper is provided at both ends of the reel, and the baffle is positioned between the two side flappers.

8. The hand winch according to claim 1, wherein the reel is provided with a cable fixing hole.

* * * * *